(12) United States Patent
Li et al.

(10) Patent No.: US 10,247,535 B2
(45) Date of Patent: Apr. 2, 2019

(54) HALL DETECTION DEVICE FOR THICKNESS OF SHEET MEDIUM

(71) Applicant: GRG Banking Equipment Co., Ltd., Guangzhou, Guangdong (CN)

(72) Inventors: Ming Li, Guangzhou (CN); Minjie Fang, Guangdong (CN); Mengtao Liu, Guangdong (CN); Wenchuan Gong, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/752,886

(22) PCT Filed: Apr. 29, 2016

(86) PCT No.: PCT/CN2016/080651
§ 371 (c)(1),
(2) Date: Feb. 14, 2018

(87) PCT Pub. No.: WO2017/036151
PCT Pub. Date: Mar. 9, 2017

(65) Prior Publication Data
US 2019/0003816 A1    Jan. 3, 2019

(30) Foreign Application Priority Data

Aug. 28, 2015    (CN) .......................... 2015 1 0543807

(51) Int. Cl.
| | | |
|---|---|---|
| G07D 7/16 | (2016.01) | |
| G01B 7/06 | (2006.01) | |
| G07D 7/164 | (2016.01) | |

(52) U.S. Cl.
CPC ............. *G01B 7/107* (2013.01); *G07D 7/164* (2013.01)

(58) Field of Classification Search
CPC .... G01B 7/107; G07D 7/164; G03G 15/5029; G03G 2215/00738; G03G 2215/00742; G03G 2215/00751
See application file for complete search history.

(56) References Cited

U.S. PATENT DOCUMENTS

| 4,693,010 A | 9/1987 | Sills | |
| 5,195,738 A * | 3/1993 | Gysling | ................... B65H 3/06 101/232 |

(Continued)

FOREIGN PATENT DOCUMENTS

| CN | 201514668 U | 6/2010 |
| CN | 102556706 A | 7/2012 |

(Continued)

OTHER PUBLICATIONS

International Search Report and Written Opinion for Application No. PCT/CN2016/080651 dated Aug. 1, 2016.

(Continued)

*Primary Examiner* — Huy Q Phan
*Assistant Examiner* — Adam Clarke
(74) *Attorney, Agent, or Firm* — Wolf, Greenfield & Sacks, P.C.

(57) ABSTRACT

A Hall detection device for a thickness of a sheet medium is provided, including a mounting rack, a reference shaft and a floating wheel assembly, wherein the floating wheel assembly includes a bracket and at least one floating wheel, one end of the bracket being mounted on the mounting rack via a floating wheel rotary shaft and the other end thereof being rotationally fitted with the floating wheel so as to form a free end, a torsional spring is provided between the floating wheel rotary shaft and the bracket so that the floating wheel elastically bears against the reference shaft, and the bracket is fixedly mounted with a detection block and a sensor for detecting a displacement amount of the detection block.

5 Claims, 5 Drawing Sheets

(56) References Cited

U.S. PATENT DOCUMENTS

| | | | |
|---|---|---|---|
| 2011/0262151 A1* | 10/2011 | Ise | B65H 3/44 |
| | | | 399/16 |
| 2014/0028999 A1* | 1/2014 | Jun | G01B 7/107 |
| | | | 356/72 |
| 2015/0261163 A1* | 9/2015 | Ishii | G03G 15/5025 |
| | | | 250/559.16 |
| 2017/0370711 A1 | 12/2017 | Liang et al. | |

FOREIGN PATENT DOCUMENTS

| | | |
|---|---|---|
| CN | 102842166 A | 12/2012 |
| CN | 103136840 A | 6/2013 |
| CN | 103743333 A | 4/2014 |
| CN | 203733194 U | 7/2014 |
| CN | 104091387 A | 10/2014 |
| CN | 104574637 A | 4/2015 |
| CN | 105096443 A | 11/2015 |
| JP | H09190562 A | 7/1997 |
| JP | 2007001739 A | 1/2007 |
| JP | 2009222686 A | 10/2009 |
| JP | 2014047073 A | 3/2014 |
| RU | 2 264 653 C1 | 11/2005 |
| RU | 2 295 702 C1 | 3/2007 |
| RU | 2 559 754 C2 | 8/2015 |
| SU | 1093886 A1 | 5/1984 |

OTHER PUBLICATIONS

Office Action for Russian Application No. 2018110324(015981), dated Nov. 26, 2018.

\* cited by examiner

HALL DETECTION DEVICE FOR THICKNESS OF SHEET MEDIUM

The present application is the National Phase of PCT Application No. PCT/CN2016/080651, filed on Apr. 29, 2016, which claims priority to Chinese patent application No. 201510543807.4 titled "HALL THICKNESS DETECTION DEVICE FOR SHEET-LIKE MEDIUM", filed with the Chinese State Intellectual Property Office on Aug. 28, 2015, the entire disclosures of which are incorporated herein by reference.

FIELD

This application relates to processing technology for sheet-like media, and in particular to a Hall thickness detection device for detecting a sheet-like valuable document in a financial self-service apparatus.

BACKGROUND

In financial self-service apparatus, in order to check valuable documents (for example, a banknote, a check, a draft, etc.) processed in batches one by one, a whole stack of the sheet-like valuable documents are required to be separated one by one. Then a single sheet-like valuable document, which is separated, is subjected to identification processes such as an image recognition process, a thickness detection process and a magnetic information detection process, so as to ensure authenticity of the sheet-like valuable document. A process for detecting the thickness of the banknote is one essential identification process. At present, the sheet-like valuable document is generally made from special materials into a sheet-like medium having certain thickness characteristics. An adhesive tape adhered to the banknote and the deflection of the banknote may be identified by means of the thickness characteristics of the sheet-like valuable document, thereby eliminating unfit banknotes. Therefore, in the financial service apparatus, the reliable identification of the thickness of a valuable document is of great significance for checking the authenticity of the valuable document.

The structure principle of a conventional thickness sensor is shown in FIG. 1. One magnet 01 is mounted opposite to each linear Hall sensor 05. Entry of a sheet-like valuable document 02 into a conveying passage, formed between a reference shaft 03 and a floating roller 04, may cause a floating roller 04 to move upward, which causes the magnet 01 also to move upward. Thus, a magnetic field sensed by a Hall sensor 05 is intensified. The Hall sensor 05 is arranged on a printed circuit board (PCB) 06 and electrically connected to a control and calculation module. The displacement of the magnet 01 is calculated by detecting the change of the magnetic field, so as to detect the thickness of the sheet-like valuable document 02. Since the change of the magnetic field is non-linear, that is, the changes of the magnetic field are different when the magnet moves the same distance from a proximal end and a distal end of the magnet respectively, changes of the output of the linear Hall sensor are also different. Thus, what is detected by the sensor is not a linear relationship. When the thickness of the sheet-like valuable document to be detected is calculated based on the actual change of the detected magnetic field, however, a linear calculation method maybe adopted for convenience of calculation. Therefore, there is a large error in a detection result obtained in such a method.

SUMMARY

In order to address the technical issue that a region, in which the magnetic flux detected by a Hall sensor in a conventional thickness detection device changes non-linearly, is small, causing a calculation result to be inaccurate, a Hall thickness detection device for a sheet-like medium is provided, which effectively extends a linear range detected by the Hall sensor and can ensure that the magnetic flux detected by the Hall sensor is substantially remained to change linearly.

This Hall thickness detection device for the sheet-like medium is provided, which includes:
  a mounting frame configured to mount and carry following components and parts;
  a reference shaft which has two ends mounted to the mounting frame via bearings;
  a floating roller assembly, including:
    a holder; and
    at least one floating roller, specifically, one end of the holder is fixedly mounted with respect to the mounting frame through a floating roller rotating shaft, another end of the holder is rotationally assembled to the floating roller to form a free end, and a torsion spring is provided between the floating roller rotating shaft and the holder to allow the floating roller to elastically abut against the reference shaft;
  a detection block fixedly mounted to a side of the holder facing away from the floating roller; and
  a sensor which is opposed to the detection block and fixedly mounted with respect to the mounting frame for detecting displacement of the detection block in a non-contact manner,
  specifically, a connection line between an axial center of the floating roller and an axial center of the reference shaft is in line with a detection center of the detection block and a detection center of the sensor, an elastically abutting point of the floating roller abutting against the reference shaft forms a tangent point, a distance from an axial center of the floating roller rotating shaft to the tangent point is equal to a distance from the axial center of the floating roller rotating shaft to a detection center of a surface of the detection block, and a connection line from the tangent point to the axial center of the floating roller rotating shaft is at an angle of 45 degrees with respect to a direction of a conveying path of the sheet-like medium.

Preferably, the detection block is a circular magnet with a radius of R2, and a distance D from a center of the magnet to a detection point of the sensor satisfies $D<(\frac{2}{3})*R2$.

Furthermore, a distance from the axial center of the floating roller rotating shaft to the tangent point is R1, wherein $R1>10*D$.

Furthermore, a distance D from the center of the magnet and the detection point of the sensor is greater than 5 times a standard thickness T of the sheet-like medium.

Compared with the conventional technology, the Hall thickness detection device for the sheet-like medium has the following advantages.

In this device, the positional relationships among the reference shaft, the floating roller, the floating roller rotating shaft, the detection block and the sensor are set and the sizes of the components are selected, such that when the sheet-like medium passes between the reference shaft and the floating roller, the change, caused by the detection block due to upward floating of the floating roller, of the detection data of

DETAILED DESCRIPTION OF EMBODIMENTS

In order to further illustrate a Hall thickness detection device for a sheet-like medium according to the present application, further detailed description is made hereinafter in conjunction with figures of one preferred embodiment of the present application.

Figure 1:
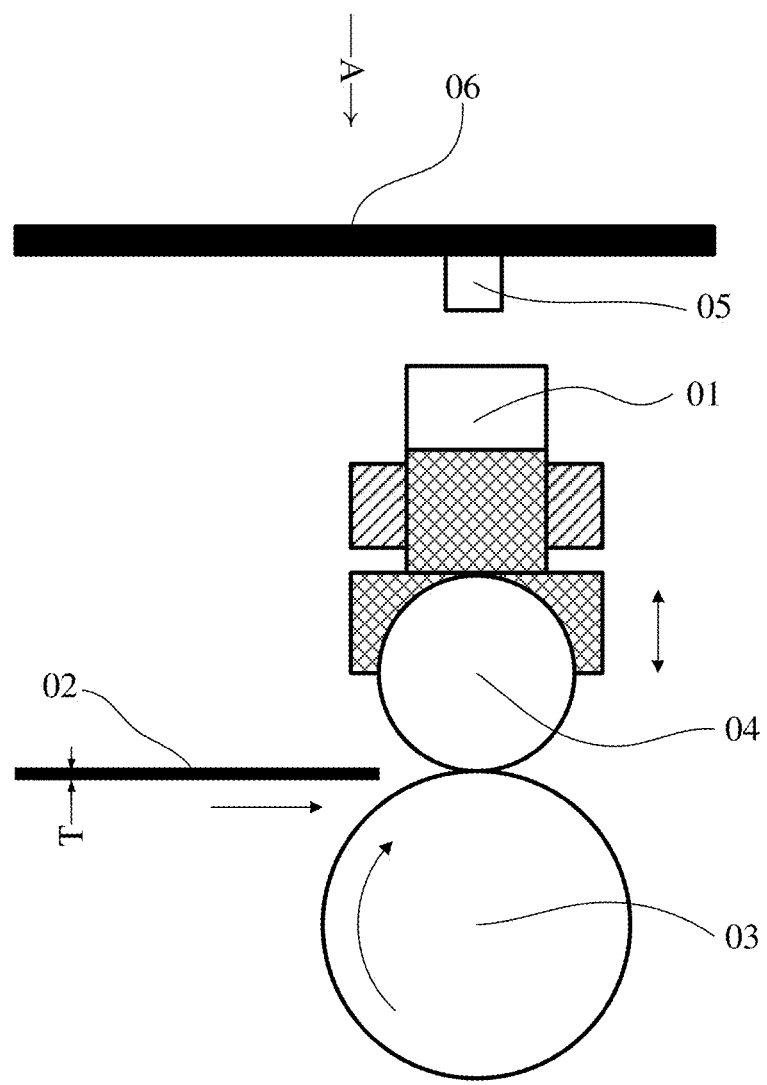
FIG. 1 is a schematic view showing the structure of a conventional Hall thickness detection device for a sheet-like medium.
Figure 2:
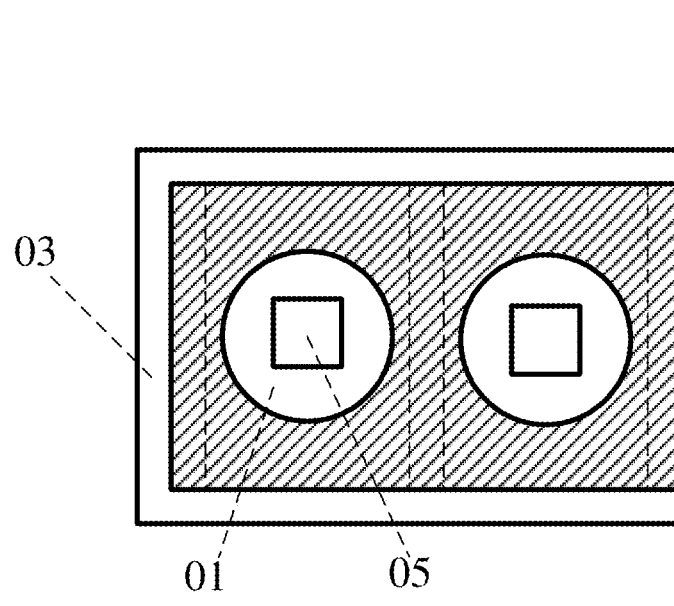
FIG. 2 is a schematic view of the Hall thickness detection device shown in FIG. 1, taken along direction A.
Figure 3:
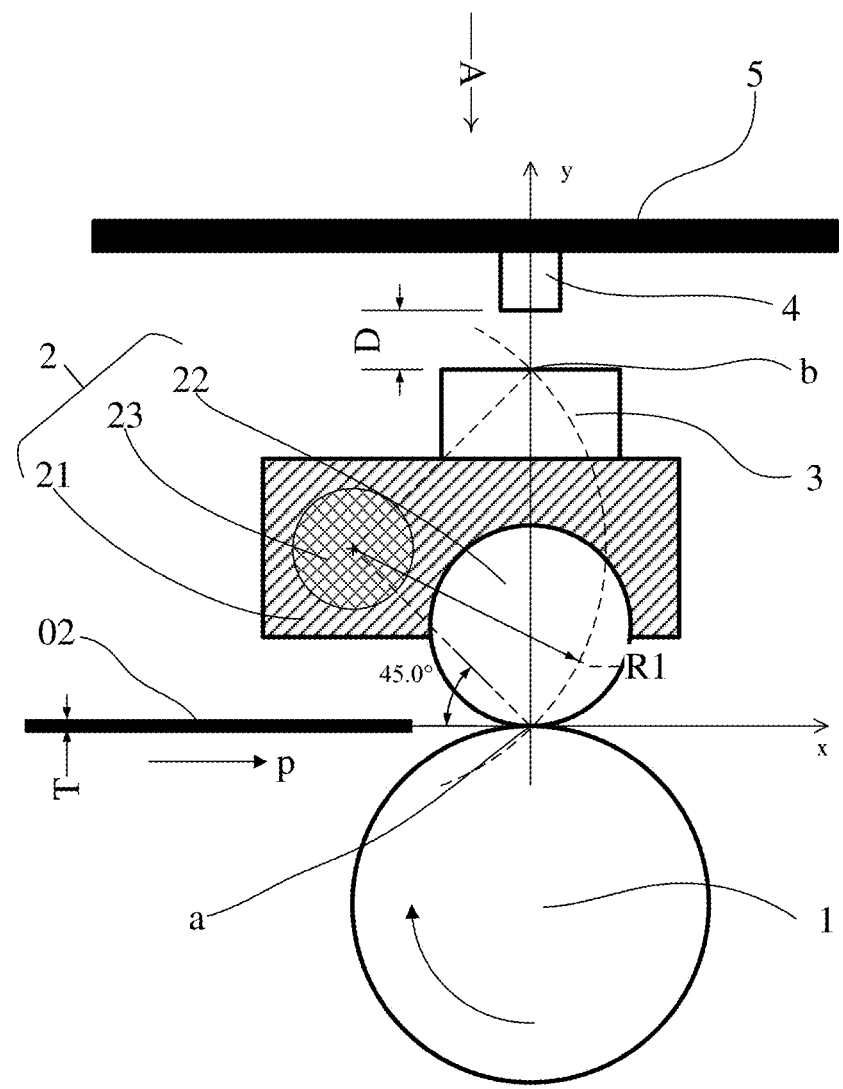
FIG. 3 is a schematic view showing components of a Hall thickness detection device for a sheet-like medium according to the present application.

Referring to FIG. 3, a preferred Hall thickness detection device for a sheet-like medium according to the present application includes a mounting frame, a reference shaft 1, a floating roller assembly 2, a detection block 3 and a sensor 4. The mounting frame is configured to mount and carry the reference shaft 1, the floating roller assembly 2, the detection block 3 and the sensor 4. Two ends of the reference shaft 1 are mounted to the mounting frame via bearings. The floating roller assembly 2 includes a holder 21 and at least one floating roller 22. One end of the holder 21 is fixedly mounted to the mounting frame through a floating roller rotating shaft 23. Another end of the holder 21 is rotationally assembled to the floating roller 22 to form a free end. A torsion spring 24 is provided between the floating roller rotating shaft 23 and the holder, which allows the floating roller 22 to elastically press against the reference shaft 1. The detection block 3 is fixedly mounted to a side, facing away from the floating roller 22, of the holder 21. The detection block 3 is a circular magnet in this embodiment. The sensor 4 is opposed to the detection block 3 and fixedly mounted with respect to the mounting frame for detecting the displacement of the detection block 3 in a non-contact manner. The sensor 4 is electrically coupled to a data processing unit, such as a PCB 5 shown in the figure. The data processing unit is configured to process the information collected by the sensor 4 and calculate an upward movement distance of the floating roller 22.

Specifically, a connection line between an axial center of the floating roller 22 and an axial center of the reference shaft 1 is in line with a detection center of the detection block 3 and a detection center of the sensor 4. An elastically pressing point of the floating roller 22 pressing against the reference shaft 1 forms a tangent point a. A distance from an axial center of the floating roller rotating shaft 23 to the tangent point a is equal to a distance from the axial center of the floating roller rotating shaft 23 to a detection center b of a surface of the detection block 3. An included angle between a connection line, between the tangent point a and the axial center of the floating roller rotating shaft 23, and a direction p of a conveying path of the sheet-like medium is 45 degrees.

Figure 4:
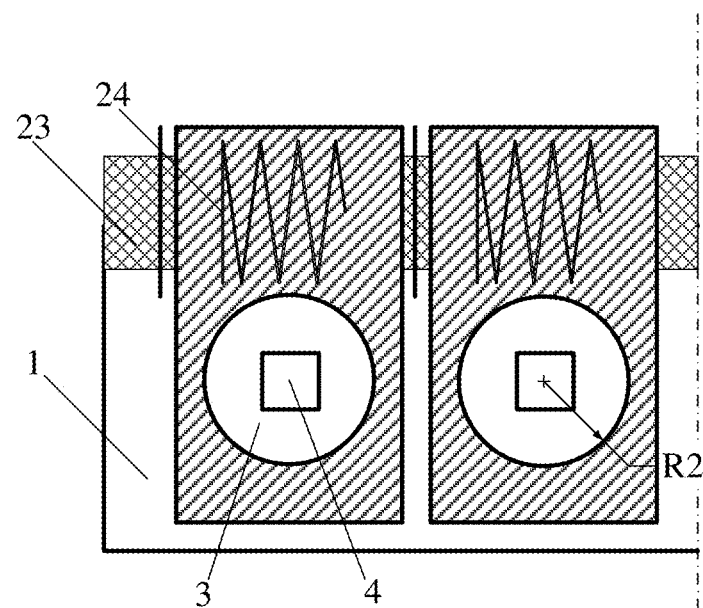
FIG. 4 is a schematic view of the Hall thickness detection device for the sheet-like medium shown in FIG. 3, taken along the direction A.

Referring to FIG. 4, in order to ensure the magnetic flux sensed by the sensor 4 to change substantially linearly due to a distance that the sheet-like medium raises the detection block 3, the detection block 3 is preferably a circular magnet with a radius R2. A distance D from the center b of the circular magnet to a detection point of the sensor 4 meets the following requirement: $D<(2/3)*R2$.

Furthermore, a distance from the axial center of the floating roller rotating shaft to the tangent point is R1, wherein $R1>10*D$.

Furthermore, the distance D from the center of the magnet to the detection point of the sensor is greater than 5 times a standard thickness T of the sheet-like medium.

Figure 5:
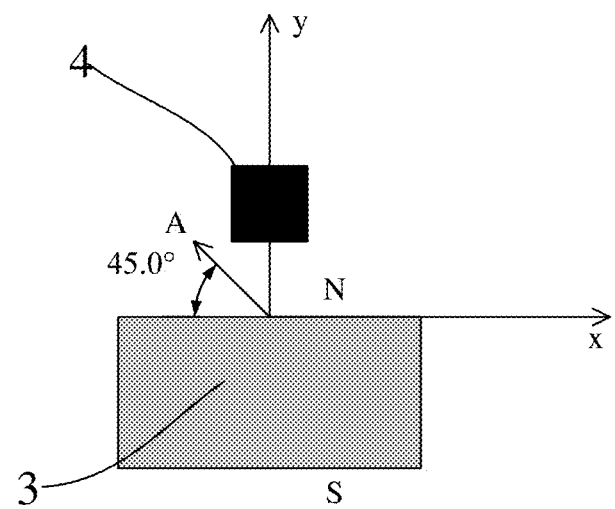
FIG. 5 is a schematic view showing an initial positional relationship between a detection block and a sensor in the detection device shown in FIG. 3 in detecting.
Figure 6:
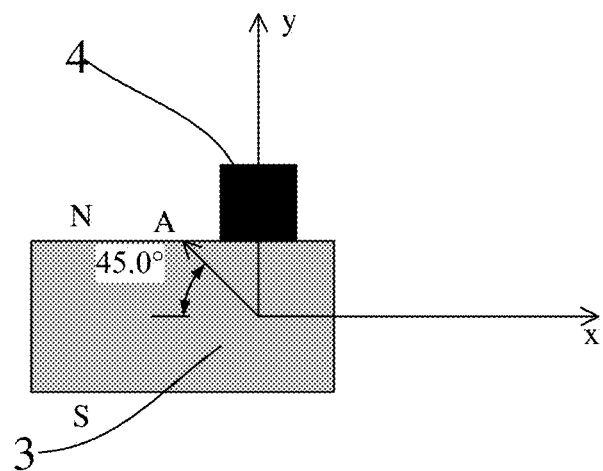
FIG. 6 is a schematic view showing a positional relationship between the detection block and the sensor in the detection device shown in FIG. 3 when the sheet-like medium is detected.
Figure 7:
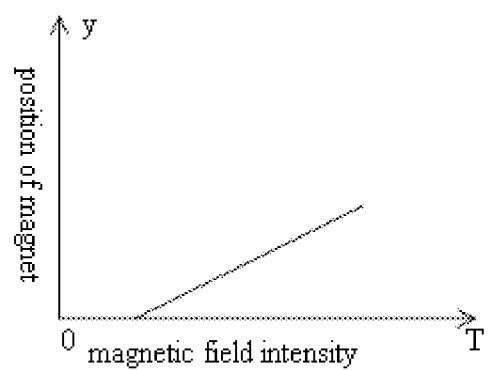
FIG. 7 is a schematic view showing a relationship between the magnetic field intensity sensed by the sensor and the position of the detection block in the detection device shown in FIG. 3.

The technical principle of an extended linear range by the Hall thickness detection device is further described hereinafter in conjunction with FIG. 5 to FIG. 7.

The change of a distance between the sensor and the magnet is nonlinear to the change in the magnetic flux sensed by the sensor. This is because the magnetic lines of force at a surface of the magnet are dense, and as the distance becomes larger, the magnetic lines of force become more and more sparse, and the magnetic field intensity becomes smaller and smaller, which causes the magnetic field intensity to be in a nonlinear relationship with the distance. Referring to FIG. 3, the positional relationships among the reference shaft 1, the floating roller 22, the floating roller rotating shaft 23, the detection block 3 and the sensor 4 are set and the sizes of the components are set, such that a detection state in which the detection block 3 and the sensor 4 are placed is an initial state shown in FIG. 5, and both the center of the detection block 3 and the center of the Hall sensor 4 are located on a y-axis. If the detection block 3 moves in a direction at 45 degrees with respect to an x-axis, that is, a direction A in FIG. 3, and a final state is shown in FIG. 6. A relationship between the magnetic field intensity sensed by the Hall sensor 4 and the position of the detection block 3 is shown in FIG. 7, which is close to linear. The horizontal axis T represents the magnetic field intensity induced by the Hall sensor, and the vertical axis represents the position, in the y-axis, of the surface of the magnet.

For the Hall thickness detection device according to this embodiment, since the reference shaft 1 is fixed to the mounting frame, circular jumping of the reference shaft 1 during rotation is as small as possible. The floating roller 22 rotates around the floating roller rotating shaft 23. The detection block 3 is fixed with respect to the floating roller 22 and rotates along with the floating roller 22. When the sheet-like medium having a thickness of T passes between the floating roller 22 and the reference shaft 1, the floating roller 22 is raised by T, and the detection block 3 is constrained by the floating roller rotating shaft 23 to rotate with a rotation radius of R1. Referring to FIG. 3, herein, both the tangent point a (a zero point of both the x-axis and the y-axis), at which the reference shaft 1 and the floating roller 22 are tangent to each other, and the center b of the detection block 3 are located at a circumference and located at the y-axis, and the detection point of the sensor 4 is also located at the y-axis. A connection line from the tangent point a, at which the reference shaft 1 and the floating roller 22 are tangent to each other, to a rotation center is at an angle of 45 degrees with respect to the x-axis. The distance D from the center b of the detection block 3 to the detection point of the sensor 4 satisfies D<⅔*R2, and R2 indicates the radius of the circular magnet. Assuming that the sheet-like medium has a thickness of T, in theory, in the case that R1 is much larger than T, when the sheet-like medium raises the floating roller 22 up by T, the floating roller 22 may have a motion trajectory along a circumference with a radius of R1 and moves in a direction at an angle of approximately 45 degrees with respect to the x-axis, that is, the floating roller 22 moves by T both in a direction x and a direction y. In this case, the center b of the detection block 3 may also move along a circumference with a radius of R1, moves in the direction at an angle of approximately 45 degrees with respect to the x-axis, and the detection block 3 moves by T both in a negative direction −x and in the direction y, thus, a relationship between the change of the magnetic field sensed by the sensor 4 and the thickness of the sheet-like medium is close to linear, and the linear range is represented by D. In practice, the size of the device cannot be increased indefinitely. Therefore, in actual design, it is impossible that R1 is much greater than T. In this embodiment, it is preferable that R1>10*D and D>5*T.

The above described embodiments are only preferred embodiments of the present application. It should be noted that the above preferred embodiments should not be construed as limiting the present application, and the scope of protection of the present application is defined by the claims. For the person skilled in the art, a few of improvements and modifications can be further made without departing from the spirit and the scope of the present application, and these improvements and modifications should also be deemed to fall into the scope of protection of the present application.

The invention claimed is:

1. A Hall thickness detection device for a sheet-like medium, comprising:
   a mounting frame,
   a reference shaft which has two ends mounted to the mounting frame via bearings, and
   a floating roller assembly,
   wherein a mounting frame configured to mount and carry the reference shaft and floating roller assembly;
   wherein the floating roller assembly comprises:
   a holder,
   at least one floating roller, wherein one end of the holder is fixedly mounted with respect to the mounting frame through a floating roller rotating shaft, and another end of the holder is rotationally assembled to the floating roller to form a free end,
   a torsion spring, which is provided between the floating roller rotating shaft and the holder to allow the floating roller to elastically press against the reference shaft,
   a detection block, which is fixedly mounted to a side, facing away from the floating roller, of the holder; and
   a sensor, which is opposed to the detection block and fixedly mounted with respect to the mounting frame for detecting displacement of the detection block in a non-contact manner,
   wherein a connection line between an axial center of the floating roller and an axial center of the reference shaft is in line with a detection center of the detection block and a detection center of the sensor, an elastically pressing point of the floating roller pressing against the reference shaft forms a tangent point, a distance from an axial center of the floating roller rotating shaft to the tangent point is equal to a distance from the axial center of the floating roller rotating shaft to a detection center of a surface of the detection block, and a connection line from the tangent point to the axial center of the floating roller rotating shaft is at an angle of 45 degrees with respect to a direction of a conveying path of the sheet-like medium.

2. The Hall thickness detection device for the sheet-like medium according to claim 1, wherein the detection block is a circular magnet with a radius of R2, and a distance D from a center of the magnet to a detection point of the sensor satisfies D<(⅔)*R2.

3. The Hall thickness detection device for the sheet-like medium according to claim 2, wherein a distance from the axial center of the floating roller rotating shaft to the tangent point is R1, wherein R1>10*D.

4. The Hall thickness detection device for the sheet-like medium according to claim 1, wherein a distance D from a center of a magnet to a detection point of the sensor is greater than 5 times a standard thickness T of the sheet-like medium.

5. The Hall thickness detection device for the sheet-like medium according to claim 2, wherein a distance D from a center of a magnet to a detection point of the sensor is greater than 5 times a standard thickness T of the sheet-like medium.

* * * * *